United States Patent [19]

Schoonebeek

[11] 3,727,311
[45] Apr. 17, 1973

[54] DENTAL ARTICULATOR

[76] Inventor: Andre T. Schoonebeek, 88 Anderson Avenue, North Babylon, N.Y. 11703

[22] Filed: Apr. 27, 1972

[21] Appl. No.: 248,232

[52] U.S. Cl. ................................................32/32
[51] Int. Cl. .............................................A61c 11/00
[58] Field of Search.......................................32/32

[56] References Cited

UNITED STATES PATENTS 1,324,319 12/1919 O'Keefe ................................32/32
2,611,961 9/1952 Neer......................................32/32

Primary Examiner—Louis G. Mancene
Assistant Examiner—J. Q. Lever
Attorney—Bauer & Amer

[57] ABSTRACT

An inexpensive articulator for dental casts and the like utilized in the manufacture of bridges, crowns, inlays, jackets and similar restorations in which the articulator supports the models in a position corresponding to their actual position in the jaws and for movement of the supported models relative to each other and for separation from each other to facilitate the unobstructed accurate shaping and sculpturing of the parts of the restoration.

10 Claims, 3 Drawing Figures

PATENTED APR 17 1973 3,727,311

3,727,311

DENTAL ARTICULATOR

BACKGROUND OF THE INVENTION

This invention relates to dental articulators and in particular to a simple and extremely inexpensive articulator for accurately supporting and adjusting dental castings and the like into positions simulating the occlusal planes of the teeth of the jaw, all of this to the end that the supported dental castings and the like can be manipulated to enable the formation, shaping and accurate sculpturing of the models and the parts thereof such that when the same are positioned in the jaws of the wearer, they will fit comfortably in the mouth in the same or in a better manner than did the originals which they supplant.

An object of the invention is to provide a dental articulator that has sufficient rigidity to support the models and the like in a position corresponding to that of the jaws of the human wearer, but has such flexibility of movement as to enable the models supported thereby to be moved in planes and directions simulating that of the movement of the human jaw.

A further object of the invention is to enable the manufacture of a dental articulator from well-known readily available inexpensive materials of such simple details of construction that the ultimate cost thereof will enable their use with but a single restoration and because of their simplicity of construction and lack of expense, may be discarded after but a single use.

Still another object and feature of the dental articulator resides in its ability to permit the separation of one of the supported models from the other to enable the same to be formed and shaped independently from and unencumbered by the articulator structure and other model structure supported thereby.

Another object of the invention is to provide a dental articulator that eliminates the need for plaster which has been previously employed and is presently employed in metallic type articulators to mount the tooth models or dentures to the upper and lower portions of such articulators.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings, wherein:

DESCRIPTION OF A PREFERRED EMBODIMENT

Figure 1:
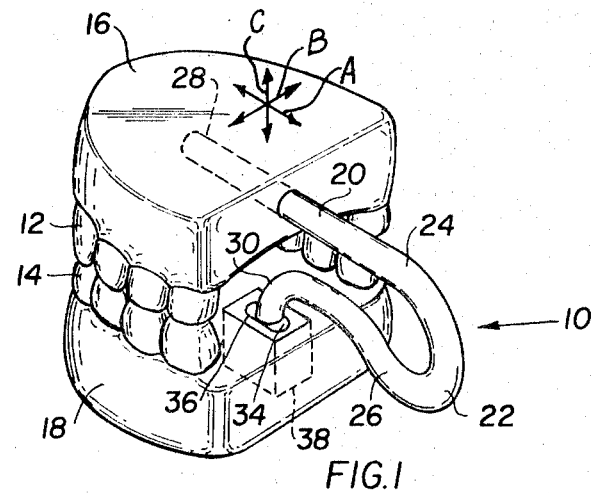
FIG. 1 is a perspective view of an articulator constructed according to the teaching of the invention and in position supporting an upper and lower model.
Figure 2:
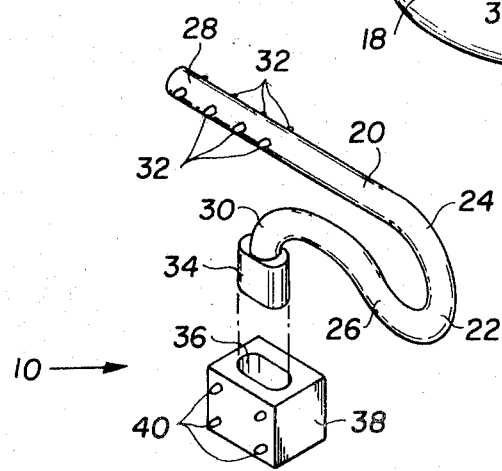
FIG. 2 is an exploded perspective view of the articulator.
Figure 3:
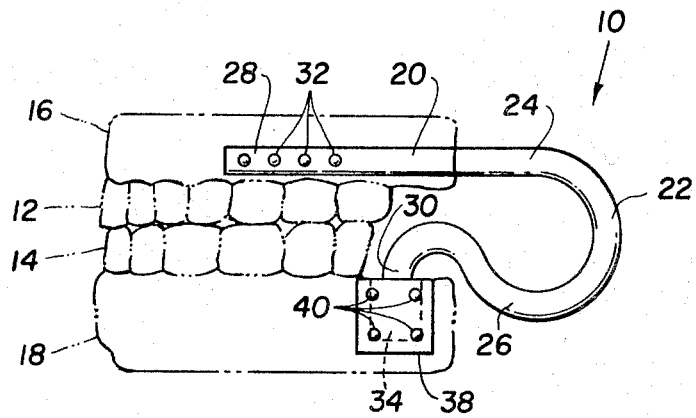
FIG. 3 is a side view of the articulator and supported models in phantom lines.

Referring now to the drawings, the numeral 10 generally identifies the dental articulator of the present invention. In the practice of the present invention, the purpose of the articulator is to position and maintain the upper and lower set of models and the casts of the teeth in a predetermined relative position corresponding to that of the position of the wearers' jaws and the teeth in such jaws. The castings of the teeth, or the models as they are more commonly referred to, are prepared previous to their application to the dental articulator.

For convenience of explanation, a set of upper and lower castings 12 and 14 of teeth are shown mounted in their respective upper and lower models 16 and 18 of the upper and lower jaws. Because the models 16 and 18 of the upper and lower jaws are those of the human wearer of the teeth 12 and 14 for which crowns, inlays, and other dental parts must be formed, such models must be initially positioned in a predetermined relationship approximating their relationship in the mouth of the wearer. In order to do this, it has been the practice in the past to utilize a dental articulator, examples of which may be found in U.S. Pat. Nos. 3,600,809, 2,550,043 and 3,621,407.

As has been the practice in the prior art, the denture model is mounted to one of the respective support arms of the articulator by providing keys in the model such that Plaster of Paris may then be applied through locking openings in the support arm of the dental articulator to match with the key of the denture model to thereby properly position the denture model on the support arm of the articulator.

Hence, if at a later time the dental technician finds it necessary to remove the denture models from the articulator, he must remove the Plaster of Paris. Thereafter, if it is necessary to return the models to the support arms of the dental articulator, he must then again properly reposition the models on the support arms by utilizing the keys previously made in the models and again applying Plaster of Paris to the dental articulator support arms to the keys, hoping that the models will then be repositioned properly on the dental articulator.

The dental articulator 10 of the present invention comprises but a single, continuous, uninterrupted rod-like body 20 that may be made from any material as plastic, metal or the like which, when formed in accordance with the teaching of the invention, has sufficient memory to retain its preformed shape. The rod-like body 20 is bent about itself in a curve to form an articulator portion 22 intermediate the ends of the body. The articulator portion 22 as shown in the drawing may be substantially U-shaped or approximating the shape of a loop. The extent of the arc or curvature of the articulator portion 22 will depend upon the nature of the material employed. In practice, it has been found that a rectangular or round rod of polyvinylchloride material bent about itself in the manner such as shown in the drawing provides unusually satisfactory results.

The legs 24 and 26 of the articulator portion 22 join together in an articulating relationship the opposite ends 28 and 30 which serve as support arms for the models 16 and 18 respectively. One of the support arms 28 or 30, here shown as the arm 28, may include engaging means 32 to aid in the support of its respective denture model 16. This is particularly helpful when the articulator arms 28 and 30 are round since the engaging means 32 aid in supporting the denture model 16 in a desired predetermined position with respect to the remaining articulator structure. In practice, it has been found that the engaging means may take other forms than that of pins as are shown. Thus, for example, notches or grooves may be used as the engaging means 32, especially when the support arms are other than round.

The other of the supporting arms, such as exemplified by arm 30, may have releasable but aligning engaging means 34. The engaging means 34 may be of any enlarged or irregular shape such as is shown in the drawing enabling the arm 30 to be engaged in a corresponding opening in its respective denture model 18 to support the same in a predetermined relationship with respect to the other denture model 16 in a position to correspond to the actual position of the jaws from which the casts were made. The enlarged or irregular shaped engaging means 34 is adapted to form a releasable engagement between its respective arm 30 and its denture model 18.

To accomplish this, the denture model 18 will have a correspondingly shaped releasable engaging opening 36 defined therein so as to enable the engagement and connecting support of the denture 18 by the arm 30 in its predetermined relation with the denture supported on the arm 28. Because of the odd or irregular shape of the cooperating engaging means 34 and 36, no matter how many times the arm 30 is released or disconnected from supporting engagement with its respective denture model 18, the engaging means 34 and 36 may be re-engaged and returned to their re-aligned predetermined relationship.

It has been found that the cooperating releasable engaging means 36 may be cast directly in the denture model 18. However, if the model is frequently engaged with and disengaged from the arm 30, it is possible its shape may be damaged. Hence, there has been provided an optional aligning insert 38 that may be cast integral with the model 18. The cooperation between the insert 38 and the model may be enhanced by the provision of protrusions 40 on the insert. When the insert 38 is utilized, the cooperating releasable aligning opening 36 may be formed therein as is shown.

In operation, the denture model 16 may be cast directly on the one support arm 28 while the denture model 18 may be cast integral with the insert 38 which will have the opening 36, or it may be cast without the insert 38, but with the opening 36 defined therein. Although the initial casting of the denture models 16 and 18 directly to the support arms 28 and 30 will be such as to place them in their predetermined vertical and horizontal relationship corresponding to the positions of the jaws from which the casts were made, possible errors in such positioning may be corrected by reshaping the bent articulating portion 22.

The relatively spaced supporting arms 28 and 30 and the joining legs 24 and 26 as well as the articulating portion 22 define a single, unitary, uninterrupted element. The articulating portion 22 has sufficient memory to retain the denture models in their predetermined initial aligned relation and also permits the legs 24 and 26 thereof to flex and move relative to each other. This thereby permits corresponding movements of the arms 28 and 30 with their respective models. Accordingly, the bent articulating portion 22 enables the arms 28 and 30 to move forward and rearward relative to each other. It also permits the arms 28 and 30 to move up and down in a vertical plane and laterally in a horizontal plane relative to each other. Because the articulating portion 22 is not hampered by any extraneous limiting structural elements, the support arms 28 and 30 are also permitted relative movements in directions and planes defining components of movement of the horizontal and vertical planes.

The versatility of movement of the denture models, when mounted on the support arms of the present articulating device 10, corresponds to that of the movement of the jaws and thereby enables the technician to more accurately detail, form, and sculpture the parts of the restorations so they will coincide with the configuration of the mouth and the original teeth they are intended to supplant or replace. Thus, in FIG. 1 it will be noted that double headed arrows have been added to indicate the versatility of movement afforded by the present invention. Arrow "A" indicates the forward and rearward motion. Arrow "B" indicates the horizontal or lateral movements. While "C" denotes vertical movements. Although there is no sign to indicated combinations of such motions, this will be readily recognized.

Should the technician find it necessary or convenient to work on one of the denture models independently of the other, he may do so simply by disengaging the same from the articulating device 10 at the releasable connection 34–36. After his work is completed, he may re-engage the same in their original aligned positions without the need to resort to the removal of Plaster of Paris or to the reapplication of adhering Plaster of Paris.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An articulator for dental restoration and the like comprising
   a unitary body having support arms each for supporting a respective denture model,
   said arms each being spaced from the other to support their respective denture models in a predetermined vertical and horizontal relation,
   said unitary support body having a portion bent to position said arms spaced from each other and for support of their respective denture models in a predetermined vertical and horizontal relation,
   and engaging means on one of said arms to releasably support its respective denture model to position the same in its predetermined vertical and horizontal relation with the denture model supported by the other of said arms.

2. An articulator for dental restoration and the like as in claim 1 wherein said bent portion assumes an effective U-shape with the unitary supporting arms being movable relative to each other at said bent portion.

3. An articulator for dental restoration and the like as in claim 2 wherein said bent portion connects each of said support arms for movement relative to each other in vertical and horizontal planes and in component movements thereof and including forward and rearward directions.

4. An articulator for dental restoration and the like as in claim 2,
   an insert having releasable engagement means for releasable engagement with said one of said arms to connect the same with its respective denture model,
   said releasable engaging means including means to align said insert and said one arm in said predetermined vertical and horizontal relation.

5. A dental articulator comprising
   a plurality of support arms each adapted to support a denture model and forming parts of a body having an articulator portion thereon intermediate said arms,
   and said articulator portion joining said arms together in a predetermined relative position and operable to permit said arms to be moved relative to each other from said predetermined relative position,
   said arms, body and articulator portion each forming a single element.

6. A dental articulator as in claim 5,
   said articulator portion being operable to permit said arms to move relative to each other forwardly and rearwardly and in a vertical plane and in a horizontal plane and in components of said planes.

7. A dental articulator as in claim 6,
   said articulator portion being effectively U-shaped with the legs of said effective U-shape being connected with said support arms and being movable with said support arms.

8. A dental articulator as in claim 6,
   insert means cooperable with one of said arms,
   said insert means and said one of said arms having releasable engaging means to enable the denture model supported by said one of said arms to be releasably connected therewith.

9. A dental articulator as in claim 6,
   one of said arms being disposed substantially horizontally and the other of said arms being disposed substantially vertically.

10. A dental articulator comprising
    a single uninterrupted rod-like body bent to form an articulator portion intermediate the ends thereof,
    said articulator portion joining together arms at the opposite ends of said body in a predetermined relative position,
    each of said arms being adapted to support a respective denture model in said predetermined relative position,
    aligning means on one of said arms for aligning its respective supported denture model in said relative position with respect to the denture model supported by the other of said arms,
    said aligning means enabling the release from and re-engagement with its respective denture model to support the same in said predetermined elative position,
    and said articulator portion being operable to enable said arms to move relative to each other forwardly and rearwardly and upwardly and downwardly and laterally and in components of such movements relative to each other from said predetermined relative position.

* * * * *